United States Patent
Kim

(10) Patent No.: US 7,269,419 B2
(45) Date of Patent: Sep. 11, 2007

(54) METHOD OF PERFORMING NETWORK SCANNING AND APPARATUS USING THE METHOD

(75) Inventor: Jin-hyung Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 18 days.

(21) Appl. No.: 11/213,903

(22) Filed: Aug. 30, 2005

(65) Prior Publication Data

US 2006/0128382 A1 Jun. 15, 2006

(30) Foreign Application Priority Data

Dec. 11, 2004 (KR) ...................... 10-2004-0104612

(51) Int. Cl.
*H04Q 7/20* (2006.01)
(52) U.S. Cl. ............... 455/434; 455/422.1; 455/403; 455/426.1; 455/500; 455/515; 455/517; 455/412.1; 358/1.1; 358/474; 358/473
(58) Field of Classification Search ............ 455/426.1, 455/426.2, 434, 412.1, 412.2, 422.1, 403, 455/550.1, 557, 575.1, 500, 515, 517, 9, 455/67.11; 358/1.1, 505, 474, 471, 473
See application file for complete search history.

(56) References Cited

U.S. PATENT DOCUMENTS 6,415,321 B1 7/2002 Gleichauf et al.

| | | |
|---|---|---|
| 2004/0039817 A1 | 2/2004 | Lee et al. |
| 2004/0043767 A1 | 3/2004 | Tsutsumi et al. |
| 2004/0077374 A1 | 4/2004 | Terry |
| 2004/0093398 A1 | 5/2004 | Tang et al. |
| 2004/0137905 A1 | 7/2004 | Jeong et al. |
| 2004/0214539 A1* | 10/2004 | Rajamani et al. ........ 455/161.1 |
| 2005/0048953 A1* | 3/2005 | Ohara ..................... 455/412.1 |
| 2005/0125682 A1* | 6/2005 | Eguchi ....................... 713/189 |

FOREIGN PATENT DOCUMENTS

| | | |
|---|---|---|
| JP | 2004-088592 | 3/2004 |
| KR | 2002-0023917 | 3/2002 |
| KR | 2003-69447 | 8/2003 |
| KR | 2004-0072815 | 8/2004 |
| KR | 2004-77567 | 9/2004 |

* cited by examiner

*Primary Examiner*—Keith T. Ferguson
(74) *Attorney, Agent, or Firm*—Roylance, Abrams, Berdo & Goodman, L.L.P.

(57) ABSTRACT

Provided is a method of performing network scanning that changes a scanning operation according to whether a wireless network printer establishes a link and performs a specific operation, and an apparatus using the method. The method of performing network scanning in the wireless network printer comprises the steps of storing the result of a passive scan for each channel; determining whether a specific operation is performed while the passive scan is performed; and stopping the passive scan when the specific operation is performed. The wireless network printer is able to perform the scanning operation without interrupting basic data communication, thereby efficiently operating the network and preventing degradation or disconnection.

14 Claims, 7 Drawing Sheets

METHOD OF PERFORMING NETWORK SCANNING AND APPARATUS USING THE METHOD

PRIORITY

This application claims the benefit under 35 U.S.C. §119(a) of Korean Patent Application No. 10-2004-104612, filed on Dec. 11, 2004, in the Korean Intellectual Property Office, the entire disclosure of which is hereby incorporated by reference.

BACKGROUND OF THE INVENTION

1. Field of the Invention

The present invention relates to a wireless network printer. More particularly, the present invention relates to a method for performing network scanning that changes a scanning operation according to whether the wireless network printer establishes a link and performs a specific operation, and an apparatus using the method.

2. Description of the Related Art

A wireless network device, such as a wireless network printer, can communicate with another wireless network device through a wireless network. FIG. 1 is a block diagram illustrating a conventional wireless network module. Referring to FIG. 1, the wireless network printer comprises the wireless network module 100 or a wireless network card in order to communicate with another wireless network device, such as a computer. The wireless network module 100 comprises a CPU 110, a read-only memory (ROM) 112, a random-access memory (RAM) 114, a non-volatile memory (NVRAM) 116, an input/output interface unit 118, and a wireless communication module 120. The CPU 110 controls the wireless network module 100. The ROM 112, RAM 114, and NVRAM 116 store programs or data. The input/output interface unit 118 communicates with an external peripheral device. The wireless communication module 120 communicates with another wireless network device though a wireless network 130. The wireless network 130 includes an 802.11b network 132, an 802.11g network 134, and an 802.11a network 136 based on the Institute of Electrical and Electronics Engineers (IEEE) 802.11 wireless network standard.

The wireless network printer enters an operation mode in order to communicate with another wireless network device. The operation mode includes an infrastructure mode or an ad-hoc mode. FIG. 2 illustrates the network configuration when in ad-hoc mode, and FIG. 3 illustrates the network configuration when in infrastructure mode.

Referring to FIG. 2, a wireless network printer 10 in the ad-hoc mode is directly connected to a peripheral wireless network device, such as a notebook computer 22 or a computer 24. Referring to FIG. 3, the wireless network printer 10 in the infrastructure mode is connected to the peripheral wireless network device, such as a notebook computer 38 through an access point (AP) 30, or connected to wired computers 32, 34, and 36 through the AP 30.

A set point relating to a wireless local area network (LAN) such as a service set identifier (SSID) and wired equivalent privacy (WEP) must be established in the wireless network printer, in order for it to communicate with another wireless network device.

The wireless network device such as the wireless network printer is referred to as a wireless station. The wireless station also includes the AP and the wireless network device such as a computer and a printer.

The wireless station performs a scanning operation, thereby searching and connecting to a peripheral network, and informs a user of the search result, so that the user can more easily select and connect to the most suitable network for the wireless station. A wireless LAN scan includes an active scan and a passive scan. The active scan is used to directly transmit a probe request packet to a station, and receive a probe response packet in response to the probe request packet. The passive scan is used to receive a beacon frame only when the station transmits the beacon frame.

The wireless station such as the computer and the printer using the wireless LAN searches for a peripheral network according to a user's instructions or automatically, and informs the user of any network found. The active scan performed at the request of the user transmits a probe packet, and receives a probe response from stations capable of responding to the probe packet in order to notify the station of what wireless network exists around the station. Such an operation is performed for each of a number of channels. In IEEE 802.11b, each of fourteen channels transmits the probe request packet, and receives the probe response packet. The probe request packet includes information such as a basic service set identifier (BSSID), the WEP, the time, or the like. The station determines signal sensitivity by receiving packets along with channel information. When the user requests the station to search for the peripheral network, the station performs the above process and informs the user of the result as shown in Table 1.

TABLE 1

| No. | SSID | Operation | WEP | BSSID | Signal |
|---|---|---|---|---|---|
| 1 | Samsung | Infrastructure | off | 0x000f0a01234 | 90% |
| 2 | Printer | Infrastructure | on | 0x000f0a01235 | 70% |
| 3 | Airportthru | ad-hoc | off | 0x02350a01234 | 50% |

FIG. 4 illustrates the scanning operations of a wireless network system. Referring to FIG. 4, the active scanning operation will now be described in more detail. When the station is in the infrastructure mode or the ad-hoc mode, the station transmits the probe request packet in each channel, first and second APs 48 and 50 or first and second ad-hoc stations 42 and 46 of the corresponding channel respond to the probe request packet. When a first infrastructure station 44 or a second infrastructure station 40 transmits the probe request packet, the first and second APs 48 and 50 or the first and second ad-hoc stations 42 and 46 respond to the probe request packet.

The passive scan is not performed at the request of the user, but the station receives the beacon frame periodically generated from the AP or the ad-hoc station in each channel to collect information. The beacon frame includes a time stamp, the SSID, a beacon interval, capability information, and the like, which are used to obtain the result as shown in Table 1.

Although the active scan can search the peripheral network faster than the passive scan, the active scan consumes more power than the passive scanning, since the active scanning method requires that the station transmit the probe request packet.

In the active scanning method, after the station transmits the probe request packet, it must stand by for a predetermined time until it receives a response, and is not able to normally perform communication during that time. This is because the station collects information while changing between a plurality of channels. An initialized station or a network client such as the computer can perform the active scan at a time desired by the user. However, since a network server such as a printer must stand by for a request from the network client at all times, active scanning by the network server causes periodic disconnection problems. Moreover, when a wireless network card supporting all the IEEE 802.11a/b/g standards is used to perform the active scan, it causes a disconnection problem for up to several minutes. Since the passive scanning method requires the station to stand by for the predetermined time until it receives the beacon frame, it also causes disconnection problems.

A channel scanning method and a channel scanning system in a wireless network are disclosed in U.S. Patent Application Publication No. 2004/0137905, the entire disclosure of which is hereby incorporated by reference.

Accordingly, there is a need for method and apparatus for passively and actively scanning a network device without causing a disconnection problem.

SUMMARY OF THE INVENTION

Embodiments of the present invention provide a method of performing network scanning that changes a scanning operation according to whether the wireless network printer establishes a link and performs a specific operation.

Embodiments of the present invention also provide an apparatus for performing network scanning that changes a scanning operation according to whether the wireless network printer establishes a link and performs a specific operation.

According to an aspect of the present invention, there is provided a method for performing network scanning in a wireless network printer, the method comprising the steps of (a) storing the result of a passive scan for each of one or more channels; (b) determining whether a specific operation is performed while the passive scan is performed; and (c) stopping the passive scan when the specific operation is performed.

According to another aspect of the present invention, there is provided an apparatus for performing network scanning in a wireless network printer, the apparatus comprising a passive scanning unit which stores the result of passive scanning for each of one or more channels; and a control unit which determines whether a specific operation is performed while passive scanning is performed, and stopping the passive scan when the specific operation is performed.

BRIEF DESCRIPTION OF THE DRAWINGS

The above aspects and advantages of the present invention will become more apparent by describing in detail an exemplary embodiment thereof with reference to the accompanying drawings in which.

Throughout the drawings, like reference numerals will be understood to refer to like parts, components and structures.

DETAILED DESCRIPTION OF EXEMPLARY EMBODIMENTS

Exemplary embodiments of the present invention will now be described more fully with reference to the accompanying drawings.

Figure 1:
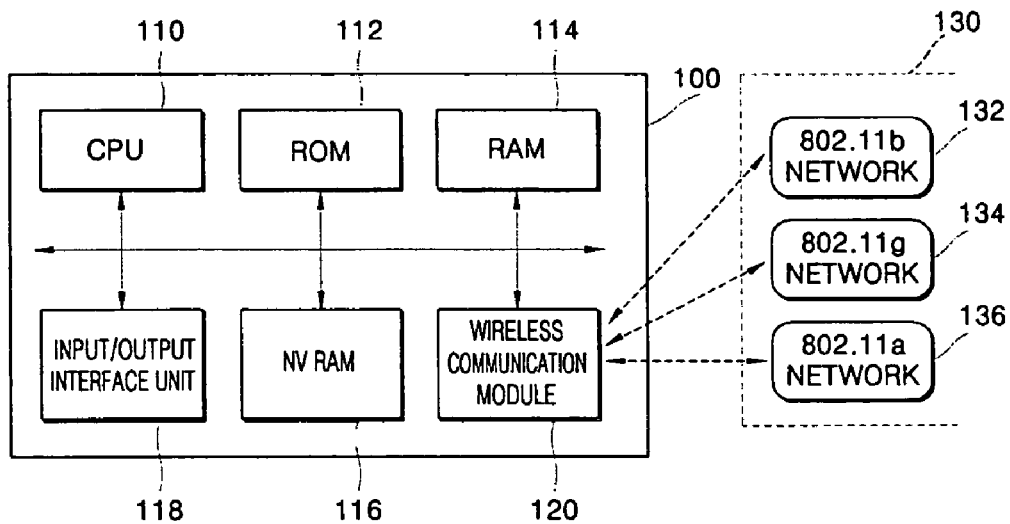
FIG. 1 is a block diagram illustrating a conventional wireless network module.
Figure 2:
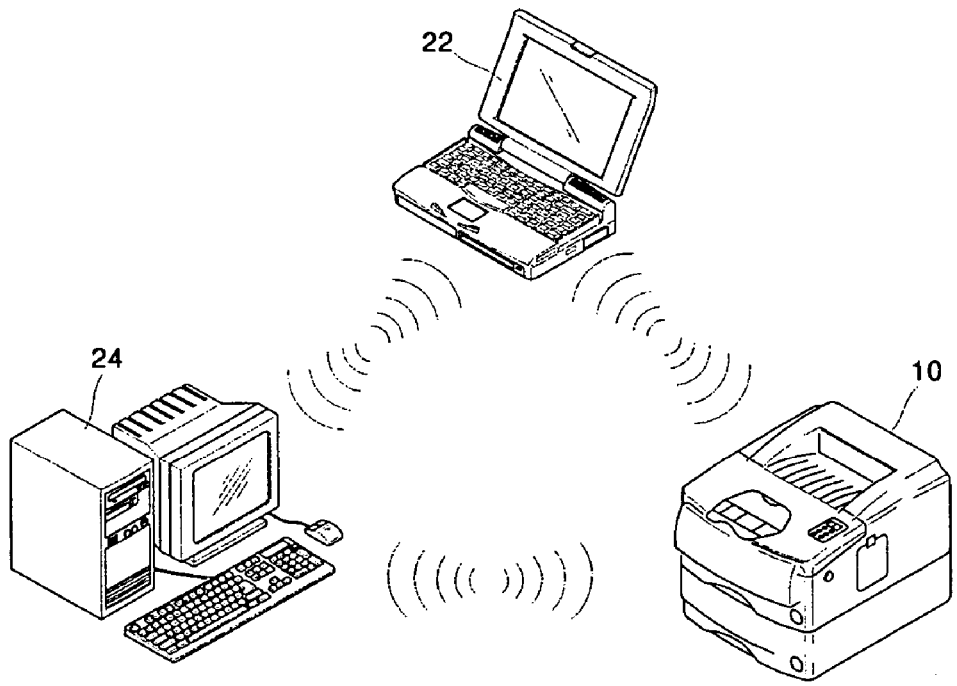
FIG. 2 illustrates a conventional wireless network module in ad-hoc mode.
Figure 3:
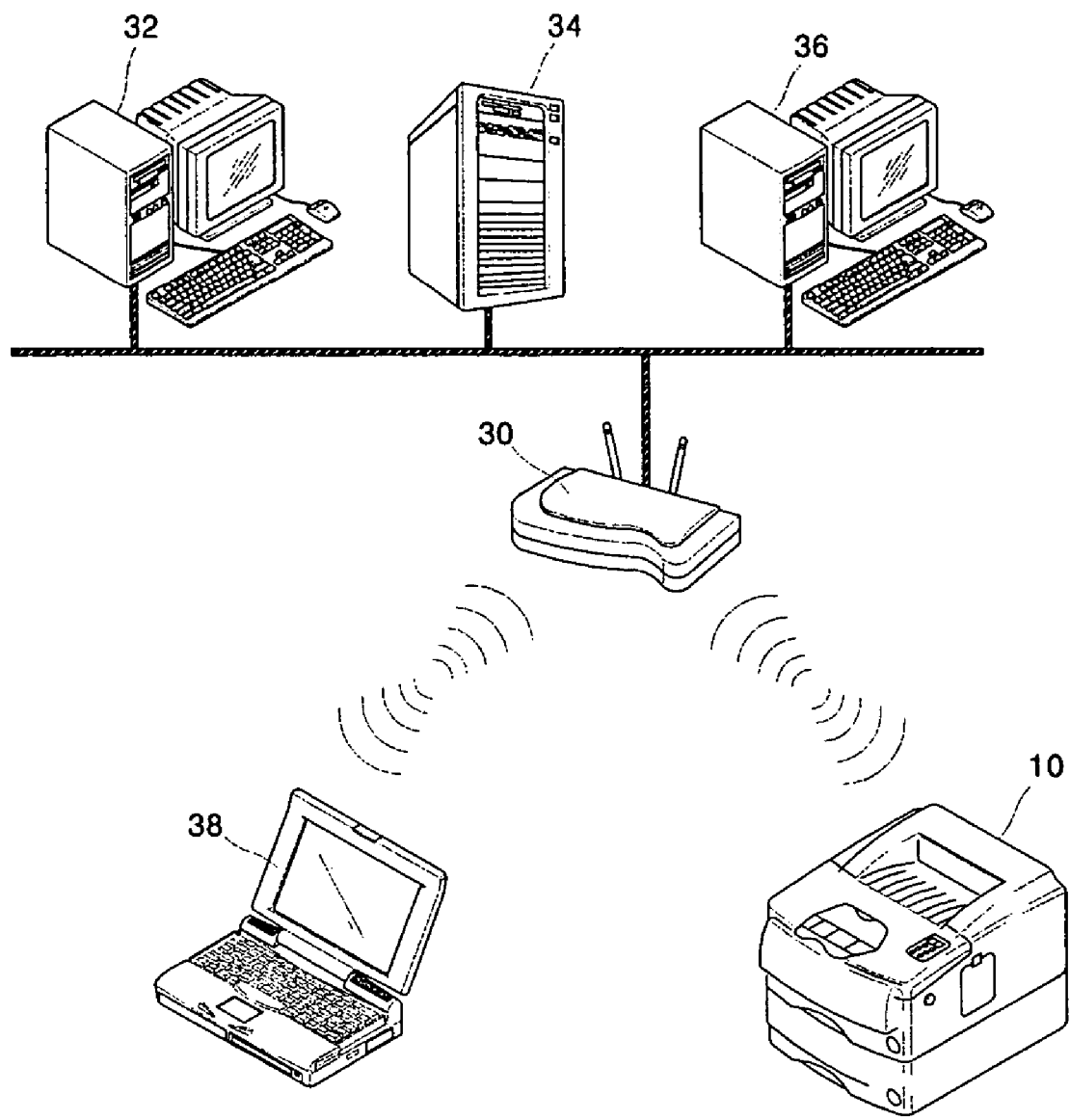
FIG. 3 illustrates a conventional wireless network module in infrastructure mode.
Figure 4:
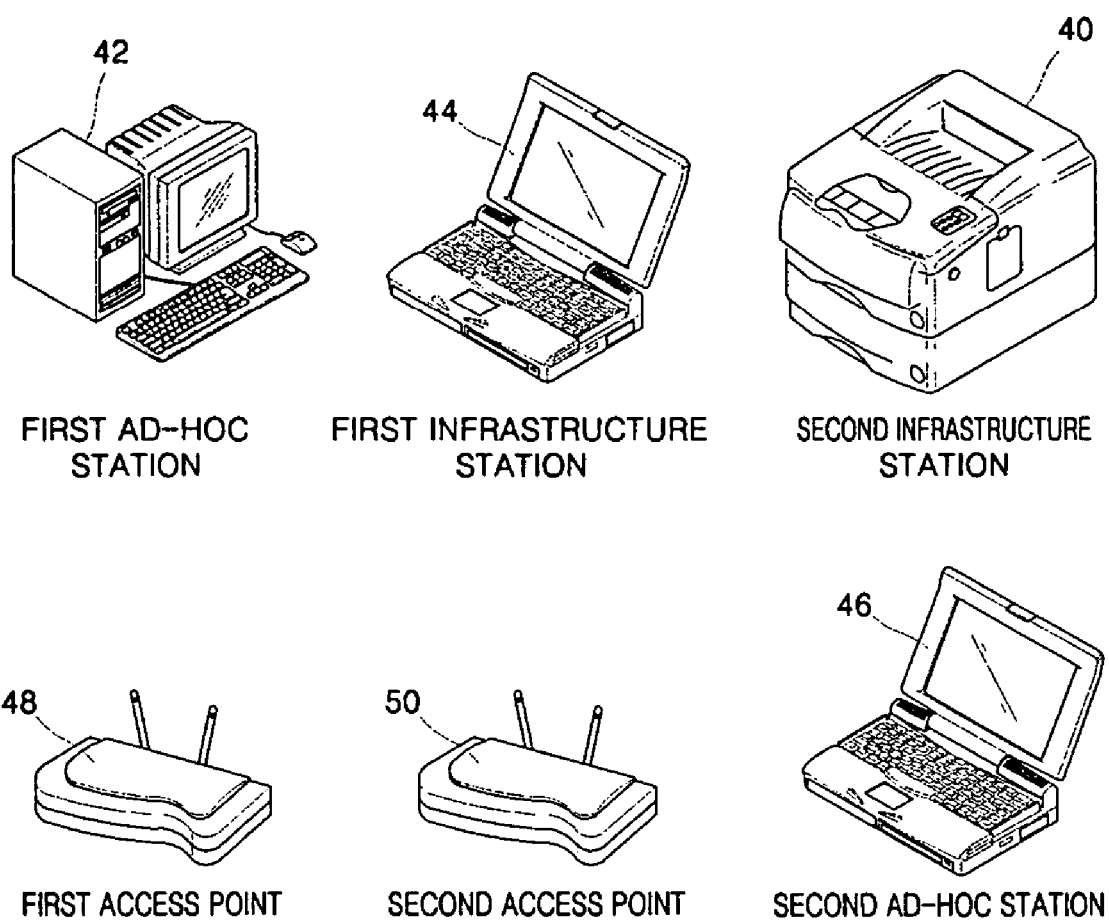
FIG. 4 illustrates the conventional scanning operations of a wireless network system.
Figure 5:
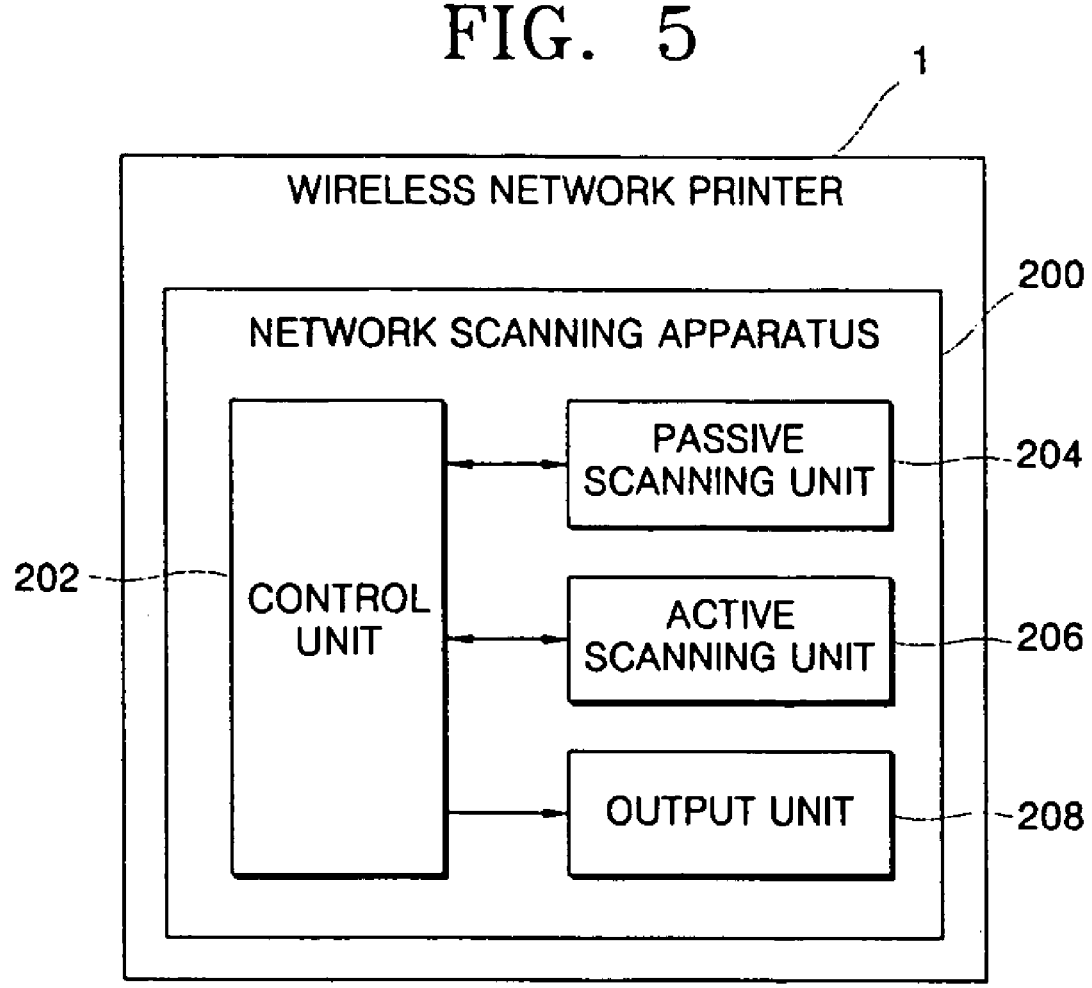
FIG. 5 is a block diagram illustrating an apparatus for performing network scanning according to an embodiment of the present invention.

FIG. 5 is a block diagram illustrating an apparatus for performing network scanning according to an embodiment of the present invention. Referring to FIG. 5, the apparatus 200 for performing network scanning comprises a control unit 202, a passive scanning unit 204, an active scanning unit 206, and an output unit 208. The apparatus 200 for performing network scanning is preferably contained in a wireless network printer 1, although, as can be appreciated by those of ordinary skill in the art, the apparatus could also be contained in other types of devices.

The passive scanning unit 204 stores a result obtained from a passive scan of each channel. The control unit 202 determines whether a specific operation, such as a printing operation, is performed, and stops the passive scanning unit 204 from performing the passive scan when it determines that the specific operation has been performed. The control unit 202 allows the passive scanning unit 204 to resume the passive scan when it determines that the specific operation has been completed. In this case, the passive scanning unit 204 resumes scanning at the channel after the channel last scanned when the passive scanning was stopped.

The active scanning unit 206 stores the result of actively scanning each channel. The control unit 202 determines whether a wireless link is established in the wireless network printer 1. When the control unit 202 determines that the wireless link is established in the wireless network printer 1, the control unit 202 allows the passive scanning unit 204 to perform the passive scan. When the control unit 202 determines that the wireless link is not established in the wireless network printer 1, the control unit 202 allows the active scanning unit 206 to perform the active scan.

When the wireless link is established in the wireless network printer 1 while the active scanning unit 206 performs active scanning, the control unit 202 stops the active scanning by the active scanning unit 206, and allows the passive scanning unit 204 to perform passive scanning.

When the active scanning or the passive scanning is completed, the output unit 208 outputs the scan result. The output unit 208 outputs the result on a display unit (not shown) such as a liquid crystal display (LCD) of the wireless network printer 1, or prints the result using the wireless network printer 1.

The wireless network printer 1 is based on the IEEE 802.11 wireless local area network (LAN) standard.

Figure 6:
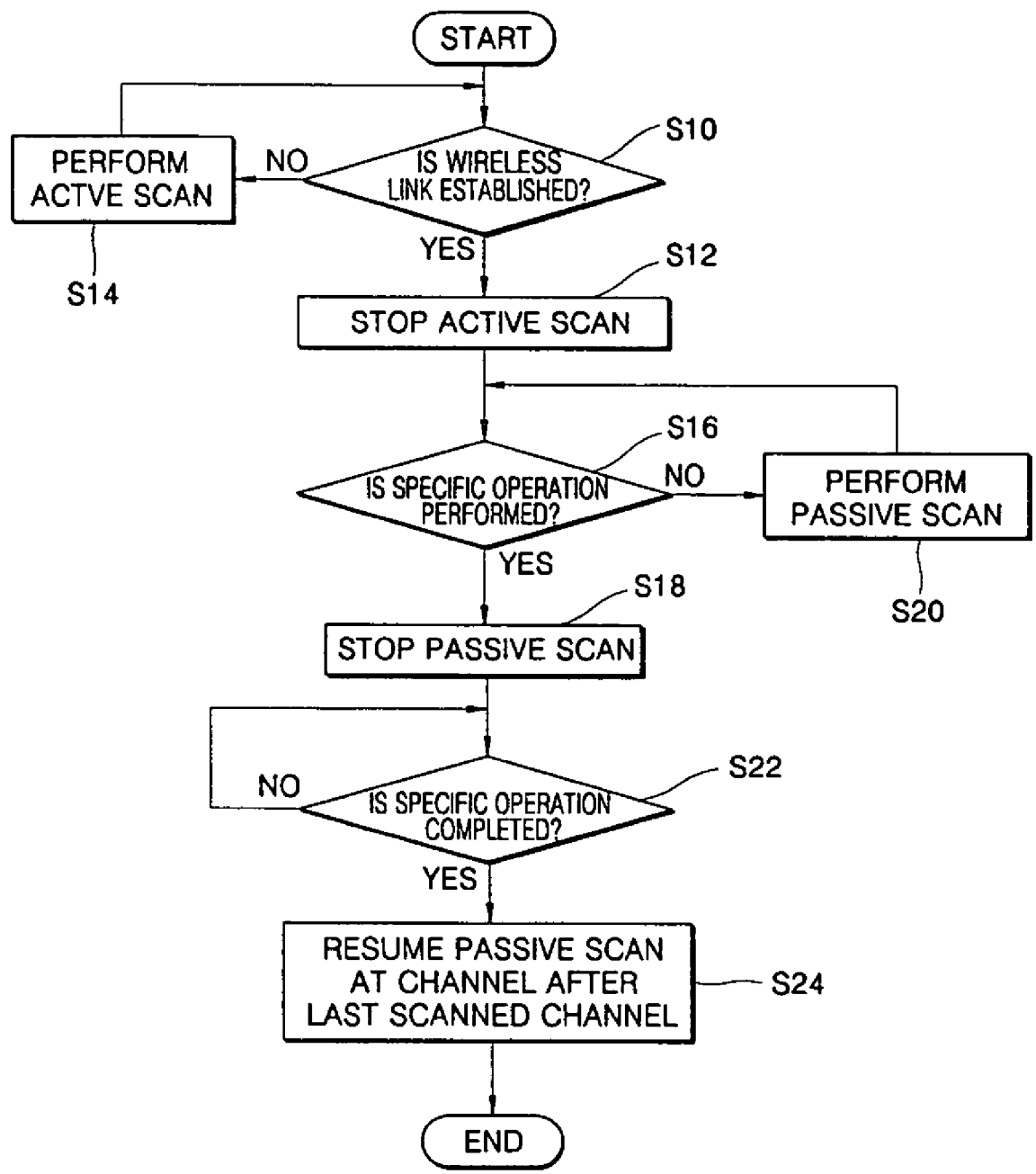
FIG. 6 is a flow chart illustrating a method of performing network scanning according to an embodiment of the present invention.

FIG. 6 is a flow chart illustrating a method of performing network scanning according to an embodiment of the present invention. Referring to FIG. 6, it is determined whether the wireless link is established in the wireless network printer 1. When it is determined that the wireless link is not established in step S10, active scanning is performed for each channel and a result is stored in step S14. When it is determined that the wireless link is established, the active scan stops in step S12.

It is determined whether the specific operation is performed in step S16. When it is determined that the specific operation is not performed, passive scanning is performed for each channel and a result is stored in step S20. When it is determined that the specific operation has been performed, the passive scan is stopped in step S18.

When it is determined that the specific operation is completed in step S22, passive scanning is resumed in step S24. In this case, the passive scanning unit 204 resumes scanning at the channel after the channel last scanned when the passive scanning was stopped. The specific operation can include a printing operation.

In step S14, when the wireless link is established in the wireless network printer 1 during the active scan, the active scan is stopped.

When the active or passive scan is completed, the result is output on the display unit (not shown) such as the LCD of the wireless network printer 1, or printed using the wireless network printer 1.

Figure 7:
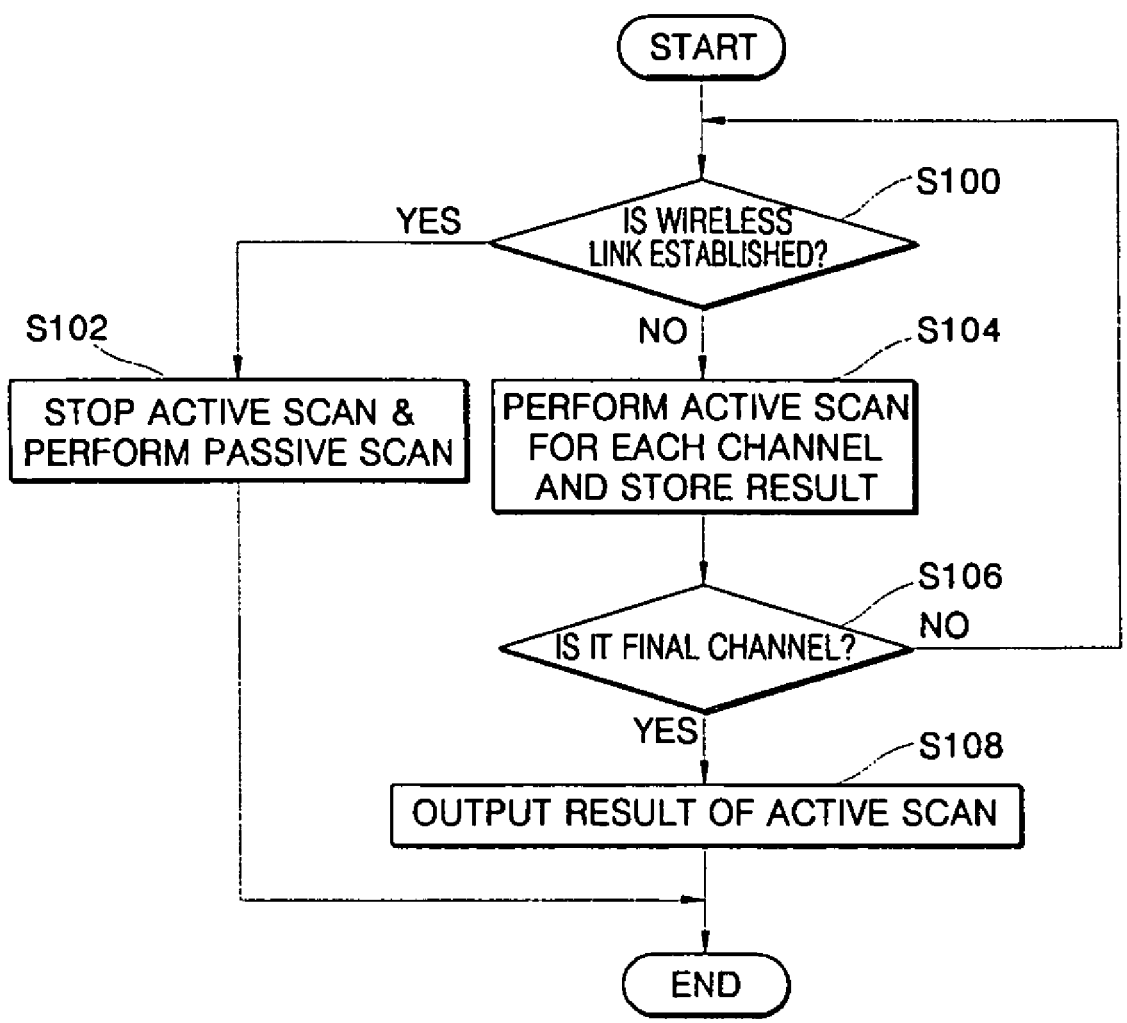
FIG. 7 is a flow chart illustrating a method of performing active scanning based on whether a wireless link is established according to an embodiment of the present invention.
Figure 8:
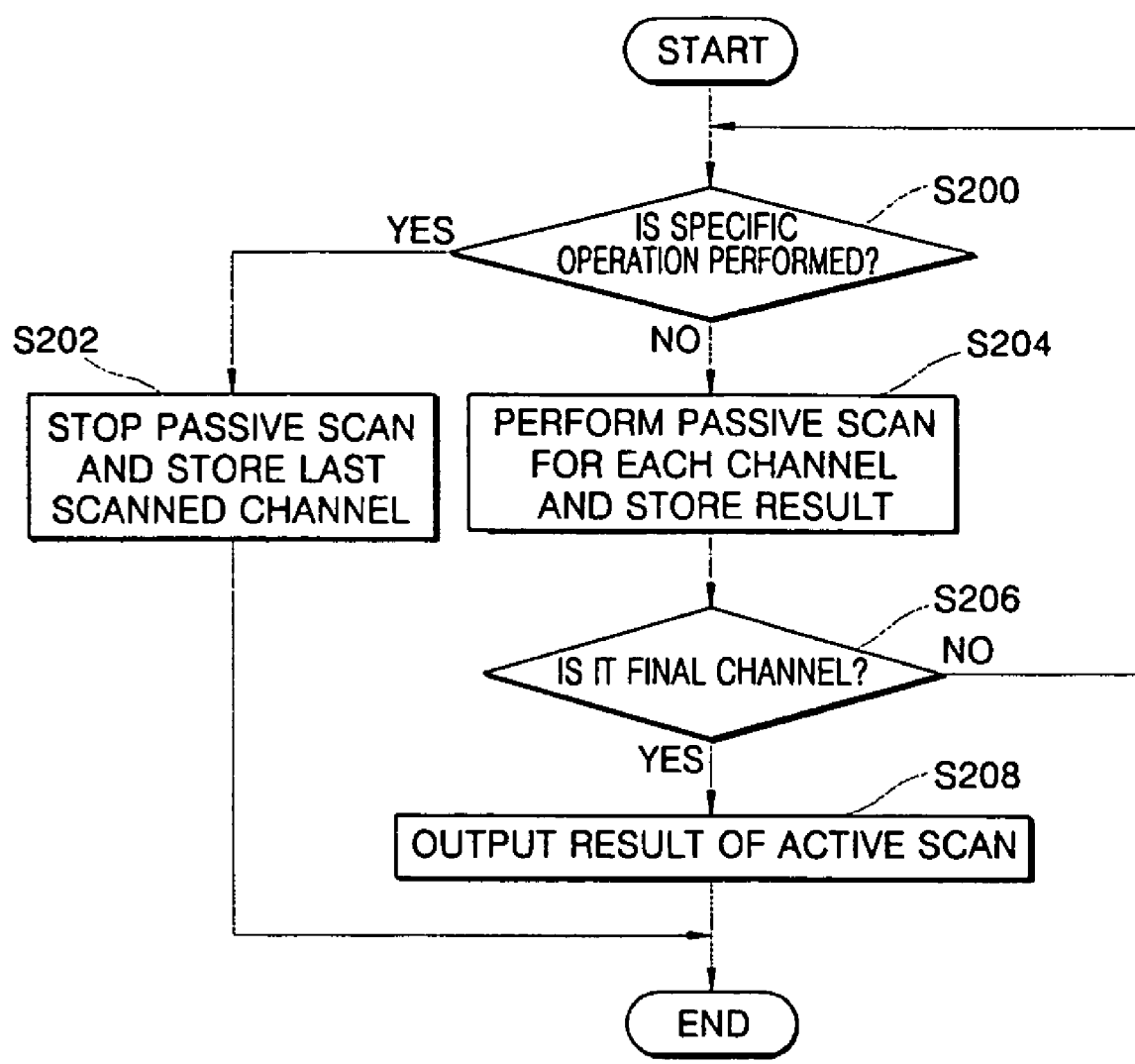
FIG. 8 is a flow chart illustrating a method of performing passive scanning based on whether a specific operation is performed according to an embodiment of the present invention.

FIG. 7 is a flow chart illustrating a method for performing active scanning according to whether a wireless link is established. FIG. 8 is a flow chart illustrating a method for performing passive scanning according to whether a specific operation is performed. Referring to FIGS. 7 and 8, the method for performing network scanning according to an embodiment of the present invention will now be described in detail.

The wireless network printer 1 periodically performs scanning in order to display the result of a search for a peripheral network on the LCD or using another program.

Referring to FIG. 7, it is determined whether the wireless link is established in the wireless network printer 1 in step S100. When the wireless network printer 1 is installed for the first time, it is determined that the wireless link is not established. When it is determined that the wireless link is not established, active scanning is performed for each channel and the result is stored in step S104. Active scanning is used because it can search channels faster than passive scanning.

It is determined whether the active scan is performed for the final channel in step S106. When it is determined that the active scan has been performed for the final channel, the result of the active scan is output in step S108. When it is determined that the active scan has not been performed for the final channel, steps S100, S104 and S106 are repeated.

When it is determined that the wireless link is established in step S100, the active scan stops and passive scanning is performed. That is, when another channel is searched, a broadcast SSID or a wireless setting value of a previously searched channel results in establishing the wireless link. The passive scan is described in more detail with reference to FIG. 8.

Referring to FIG. 8, it is determined whether the specific operation, such as a printing operation, is performed in step S200. When it is determined that the specific operation is performed, the passive scanning stops and the last scanned channel is stored in step S202. When it is determined that the specific operation is not performed, passive scanning is performed channel by channel and the result is stored in step S204.

After storing the result of the passive scan, it is determined whether the passive scan is performed for the final channel in step S206. When it is determined that the passive scan has been performed for the final channel, the result of the passive scan is output in step S208. When it is determined that the passive scan has not been performed for the final channel, steps S200, S204, and S206 are repeated. When the specific operation is performed before the next channel is scanned, the passive scan stops and the last scanned channel is stored in step S202. The specific operation can be a printing operation, a hypertext transfer protocol (HTTP) connection, a web server connection, or the like, which normally and efficiently perform communication over a connection.

When it is determined that the specific operation has been completed, the passive scan is resumed (not shown). In this case, the passive scan resumes at the channel after that which was scanned before the passive scanning stopped.

After a predetermined time, the passive or active scan is performed in step S100 of FIG. 7 according to a time established by the user or a designated time.

Although embodiments of the present invention are based on the wireless network printer, the present invention is not limited thereto. Also, it is not necessary for embodiments of the present invention to perform both passive scanning and active scanning. Embodiments of the present invention are able to determine whether to perform passive scanning according to whether the specific operation is performed, and inform the user of the result of the passive scan, without interrupting data communication between wireless stations.

As described above, embodiments of the present invention make it possible for the wireless network printer to perform the scanning operation without interrupting basic data communication, thereby efficiently operating the network and preventing degradation of data or disconnection of network service.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of performing network scanning in a wireless network printer, the method comprising the steps of:
   (a) storing the result of a passive scan for each of one or more channels;
   (b) determining whether a specific operation is performed while the passive scan is performed;
   (c) stopping the passive scan when the specific operation is performed;
   (d) determining whether a wireless link is established in the wireless network printer; and
   (e) allowing the passive scan and storing the results of the passive scan for each channel when it is determined that the wireless link is established in the wireless printer, and allowing an active scan and storing the result of the active scan when it is determined that the wireless link is not established in the wireless printer.

2. The method of claim 1, further comprising the step of:
   after step (c), when the specific operation is completed, resuming the passive scan.

3. The method of claim 2, comprising the step of:
   performing passive scanning for the channel after that which was scanned before the passive scanning stopped.

4. The method of claim 1, further comprising the step of:
when the wireless link is established in the wireless network printer while active scanning is performed, stopping the active scan and storing the result of a passive scan for each channel.

5. The method of claim 1, wherein the specific operation includes a printing operation.

6. The method of claim 1, wherein the wireless network printer is based on the IEEE 802.11 wireless local area network (LAN) standard.

7. The method of claim 1, further comprising the step of:
outputting the result of the active scanning or the passive scanning.

8. An apparatus for performing network scanning in a wireless network printer, the apparatus comprising:
a passive scanning unit which stores the result of passive scanning for each of one or more channels;
a control unit which determines whether a specific operation is performed while passive scanning is performed, and stopping the passive scan when the specific operation is performed;
an active scanning unit which stores the result of an active scan for each channel; and
wherein the control unit determines whether a wireless link is established in the wireless network printer, allows the passive scanning unit to perform passive scanning when the wireless link is established in the wireless network printer, and allows the active scanning unit to perform active scanning when the wireless link is not established in the wireless network printer.

9. The apparatus of claim 8, wherein the control unit allows the passive scan to be resumed after the specific operation is completed.

10. The apparatus of claim 9, wherein the passive scanning unit performs passive scanning at the channel after the last scanned channel when the passive scanning was stopped.

11. The apparatus of claim 8, wherein the control unit stops the active scanning unit from performing the active scan, and allows the passive scanning unit to perform the passive scan, when the wireless link is established in the wireless network printer while the active scanning unit performs active scanning.

12. The apparatus of claim 8, wherein the specific operation includes a printing operation.

13. The apparatus of claim 8, wherein the wireless network printer is based on the IEEE 802.11 wireless LAN standard.

14. The apparatus of claim 8, further comprising:
an output unit which outputs the result of the active scanning or the passive scanning.

\* \* \* \* \*